(12) United States Patent
Kim et al.

(10) Patent No.: US 8,797,938 B2
(45) Date of Patent: Aug. 5, 2014

(54) MULTICASTING SYSTEM AND METHOD FOR VEHICULAR COMMUNICATION NETWORK

(75) Inventors: Jung-Sook Kim, Daejeon (KR); Dong-Kyoo Kim, Chungcheongnam-do (KR); Dong-Yong Kwak, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 130 days.

(21) Appl. No.: 13/494,639

(22) Filed: Jun. 12, 2012

(65) Prior Publication Data

US 2012/0314643 A1    Dec. 13, 2012

(30) Foreign Application Priority Data

Jun. 13, 2011   (KR) .................. 10-2011-0057061
Dec. 14, 2011   (KR) .................. 10-2011-0134841

(51) Int. Cl.
| | | |
|---|---|---|
| *H04H 20/71* | (2008.01) | |
| *H04W 4/00* | (2009.01) | |
| *H04J 3/00* | (2006.01) | |
| *H04B 7/212* | (2006.01) | |

(52) U.S. Cl.
USPC .................. 370/312; 370/331; 370/337

(58) Field of Classification Search
None
See application file for complete search history.

(56) References Cited

U.S. PATENT DOCUMENTS

| | | | |
|---|---|---|---|
| 7,099,625 B1* | 8/2006 | Yoshida ...................... | 455/62 |
| 8,514,825 B1* | 8/2013 | Addepalli et al. ............ | 370/338 |
| 2005/0168350 A1* | 8/2005 | Tauchi ......................... | 340/903 |
| 2005/0207370 A1* | 9/2005 | Harada ......................... | 370/321 |
| 2007/0004437 A1* | 1/2007 | Harada et al. ................. | 455/506 |
| 2009/0147718 A1 | 6/2009 | Liu et al. | |
| 2009/0154379 A1* | 6/2009 | Hayashi et al. ............... | 370/280 |
| 2009/0167513 A1* | 7/2009 | Hill et al. ..................... | 340/435 |
| 2009/0279470 A1 | 11/2009 | Seok | |
| 2009/0296680 A1* | 12/2009 | Suzuki et al. ................. | 370/342 |
| 2011/0044172 A1* | 2/2011 | Yim et al. ..................... | 370/236 |

(Continued)

FOREIGN PATENT DOCUMENTS

KR    1020110018895 A    2/2011

OTHER PUBLICATIONS

R. Saeed, A. Naemat, A. Aris, M. Awang, "Design and Evaluation of Lightweight IEEE 802.11p-based TDMA MAC method for Road Side-to-Vehicle Communications", Access Network Technology, Feb. 2010, entire document.*

(Continued)

*Primary Examiner* — Suk Jin Kang
(74) *Attorney, Agent, or Firm* — William Park & Associates Patent Ltd.

(57) ABSTRACT

Disclosed herein are a multicasting system and method for a vehicular communication network. The multicasting system includes a plurality of roadside communication devices for communicating with a plurality of vehicular communication devices. Each of the roadside communication devices includes a communication unit for communicating with the plurality of vehicular communication devices and at least one neighboring roadside communication device, a beacon analysis unit for analyzing beacon frames when a slot allocation request is received from one of the vehicular communication devices, a determination unit for searching for a period in which a slot has not been allocated and determining whether a period for allocation of a slot to the vehicular communication device is present, and a slot allocation unit for allocating a slot period for multicasting of the vehicular communication device based on results of the determination of the determination unit.

14 Claims, 7 Drawing Sheets

(56) References Cited

U.S. PATENT DOCUMENTS

2011/0128902 A1* 6/2011 Guo .............................. 370/312
2012/0093091 A1* 4/2012 Kang et al. .................... 370/329
2013/0301584 A1* 11/2013 Addepalli et al. ............ 370/329

OTHER PUBLICATIONS

B. Li, M. Mirhashemi, X. Laurent, J. Gao, "Wireless Access for Vehicular Environments", 2010, entire document.*

* cited by examiner

| | | | 61 | | | |
|---|---|---|---|---|---|---|
| B1 | ALLOCATED 201 1st Slot | ALLOCATED 201 2nd Slot | NOT-ALLOCATED 3rd Slot | NOT-ALLOCATED 4th Slot | ALLOCATED 110 5th Slot | ALLOCATED 101 6th Slot | NOT-ALLOCATED 7th Slot |

| | | | 63 | | | |
|---|---|---|---|---|---|---|
| B2 | NOT-ALLOCATED 1st Slot | NOT-ALLOCATED 2nd Slot | ALLOCATED 202 3rd Slot | NOT-ALLOCATED 4th Slot | NOT-ALLOCATED 5th Slot | NOT-ALLOCATED 6th Slot | ALLOCATED 140 7th Slot |

| | | | 65 | | | |
|---|---|---|---|---|---|---|
| B3 | ALLOCATED 203 1st Slot | ALLOCATED 150 2nd Slot | NOT-ALLOCATED 3rd Slot | NOT-ALLOCATED 4th Slot | ALLOCATED 160 5th Slot | NOT-ALLOCATED 6th Slot | NOT-ALLOCATED 7th Slot |

FIG.6

| B1 | ALLOCATED 201 1st Slot | ALLOCATED 120 2nd Slot | NOT-ALLOCATED 3rd Slot | NOT-ALLOCATED 4th Slot | ALLOCATED 110 5th Slot | ALLOCATED 101 6th Slot | NOT-ALLOCATED 7th Slot |
|---|---|---|---|---|---|---|---|

| | | | 63 | | | |
|---|---|---|---|---|---|---|
| B2 | NOT-ALLOCATED 1st Slot | NOT-ALLOCATED 2nd Slot | ALLOCATED 202 3rd Slot | ALLOCATED 130 4th Slot | NOT-ALLOCATED 5th Slot | NOT-ALLOCATED 6th Slot | ALLOCATED 140 7th Slot |

| B3 | ALLOCATED 203 1st Slot | ALLOCATED 150 2nd Slot | NOT-ALLOCATED 3rd Slot | NOT-ALLOCATED 4th Slot | ALLOCATED 160 5th Slot | NOT-ALLOCATED 6th Slot | NOT-ALLOCATED 7th Slot |
|---|---|---|---|---|---|---|---|

| ... | Destination Device List | ... | ... |
|---|---|---|---|
| MAC header | | | MAC payload |

MULTICASTING SYSTEM AND METHOD FOR VEHICULAR COMMUNICATION NETWORK

CROSS-REFERENCE TO RELATED APPLICATIONS

This application claims the benefit of Korean Patent Application No. 10-2011-0057061, filed on Jun. 13, 2011, and Korean Patent Application No. 10-2011-0134841, filed on Dec. 14, 2011, which are hereby incorporated by reference in their entirety into this application.

BACKGROUND OF THE INVENTION

1. Technical Field

The present invention relates generally to a multicasting system and method for a vehicular communication network and, more particularly, to a multicasting system and method for a vehicular communication network, which are capable of improving the reliability of the transmission of TDMA-based data packets between a roadside communication device and a vehicular communication device.

2. Description of the Related Art

Multicasting has the advantage of reducing traffic because it transfers the same frame to a plurality of target terminals at the same time. Thanks to this advantage, multicasting is utilized in a variety of applications. In particular, many applications requiring vehicular communication have high needs for multicasting and broadcasting.

The current IEEE 802.11p standard does not support the retransmission of multicast and broadcast frames. For example, in the case of unicast transmission, a reception is acknowledged via a reception ACK frame, and a source terminal retransmits the same frame if the ACK frame is not received.

In this case, fair throughput is achieved in connection with other neighboring terminals by exponentially increasing a contention window, and the source terminal adjusts a physical layer rate based on the frame error rate. However, a multicast service does not support a protocol which is used in the above-described unicast transmission, and therefore it is difficult to provide Quality of Service (QoS).

Although technologies for solving the problem have been proposed, most of them are related to multicast techniques based on the CSMA/CA-based MAC technology. That is, the TDMA-based MAC technology may be suitable for vehicle control and driving context-aware applications that require high-reliability communication within a predetermined communication delay time. Although the CSMA/CA-based MAC technology has high fairness, it has the problem of being unable to guarantee the success of communication within a predetermined delay time when network traffic increases.

SUMMARY OF THE INVENTION

Accordingly, the present invention has been made keeping in mind the above problems occurring in the prior art, and an object of the present invention is to provide a multicasting system and method for a vehicular communication network, which are capable of improving the reliability of transmission of TDMA-based data packets between a roadside communication device and a vehicular communication device.

In order to accomplish the above object, the present invention provides a multicasting system for a vehicular communication network, including a plurality of roadside communication devices for communicating with a plurality of vehicular communication devices, wherein each of the roadside communication devices includes a communication unit for communicating with the plurality of vehicular communication devices and at least one neighboring roadside communication device; a beacon analysis unit for analyzing beacon frames received from the corresponding roadside communication device and the at least one neighboring roadside communication device when a slot allocation request is received from one of the vehicular communication devices; a determination unit for searching for a period in which a slot has not been allocated by the corresponding roadside communication device and the at least one neighboring roadside communication device and determining whether a period for allocation of a slot to the vehicular communication device is present; and a slot allocation unit for allocating a slot period for multicasting of the vehicular communication device based on results of the determination of the determination unit.

The determination unit may search for a period in which a slot has not been allocated in common by the corresponding roadside communication device and the at least one neighboring roadside communication device.

The communication unit may communicate using superframes that are used in a Time Division Multiple Access (TDMA) Media Access Control (MAC) communication system.

Each of the superframes includes a beacon period in which the beacon frame of the roadside communication device is sent, a competitive advantage period in which media is accessed, a non-competitive multicast period in which the slot period is allocated to the vehicular communication device, and a non-competitive unicast period in which the vehicular communication device sends data packets via the allocated slot period.

The slot allocation unit may send information about the allocation of the slot period to the vehicular communication device with the information included in a beacon frame; and the information about the allocation of the slot period may be stored in an MCP TimeSlotAllocationInfo field of the beacon frame.

The MCP TimeSlotAllocationInfo field of the beacon frame may include MCP TimeSlotInfo fields containing n pieces of information about slots allocated by the slot allocation unit, and a length field containing information about a number of the MCP TimeSlotInfo fields.

Each of the MCP TimeSlotInfo fields may include at least one of a field containing information about allocation or non-allocation of a slot, an owner ID field containing information about an ID of a communication device to which the slot was allocated, a TimeSlot location field containing information about a location of the corresponding slot, and a Time Slot duration field containing information about a length of the corresponding slot.

The slot allocation unit, when the vehicular communication device enters a data communication area of the corresponding roadside communication device after a slot period has been allocated by the at least one neighboring roadside communication device, may allocate information about the entry of the corresponding vehicular communication device to a period which belongs to a slot period of the beacon frame of the corresponding roadside communication device and which corresponds to the slot period allocated by the at least one neighboring roadside communication device.

The communication unit may be connected, via communication, to neighboring roadside communication devices which are spaced apart by one hop.

In order to accomplish the above object, the present invention provides a multicasting method for a vehicular communication network, including a plurality of roadside communication devices for communicating with a plurality of vehicular communication devices, the method including, by each of the roadside communication devices, receiving a beacon frame from at least one neighboring roadside communication device when a slot allocation request is received from each of the vehicular communication devices; analyzing beacon frames received from the corresponding roadside communication device and the at least one neighboring roadside communication device; searching for a period in which a slot has not been allocated by the corresponding roadside communication device and the at least one neighboring roadside communication device; and allocating a slot period for multicasting of the vehicular communication device based on results of the searching of the determination unit.

The searching may include searching for a period in which a slot has not been allocated in common by the corresponding roadside communication device and the at least one neighboring roadside communication device.

The allocating may include sending information about the allocation of the slot period to the vehicular communication device with the information included in a beacon frame; and the information about the allocation of the slot period may be stored in an MCP TimeSlotAllocationInfo field of the beacon frame.

The MCP TimeSlotAllocationInfo field of the beacon frame may include MCP TimeSlotInfo fields containing n pieces of information about allocated slots, and a length field containing information about a number of the MCP TimeSlotInfo fields.

Each of the MCP TimeSlotInfo fields may include at least one of a field containing information about allocation or non-allocation of a slot, an owner ID field containing information about an ID of a communication device to which the slot was allocated, a TimeSlot location field containing information about a location of the corresponding slot, and a Time Slot duration field containing information about a length of the corresponding slot.

The allocating may include, when the vehicular communication device enters a data communication area of the corresponding roadside communication device after a slot period has been allocated by the at least one neighboring roadside communication device, allocating information about the entry of the corresponding vehicular communication device to a period which belongs to a slot period of the beacon frame of the corresponding roadside communication device and which corresponds to the slot period allocated by the at least one neighboring roadside communication device.

The receiving may include receiving a beacon frame from at least one neighboring roadside communication device which is spaced apart by one hop.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, throughout which the same reference numerals are used to designate the same or similar components.

Embodiments of the present invention will be described with reference to the accompanying drawings below.

Figure 1:
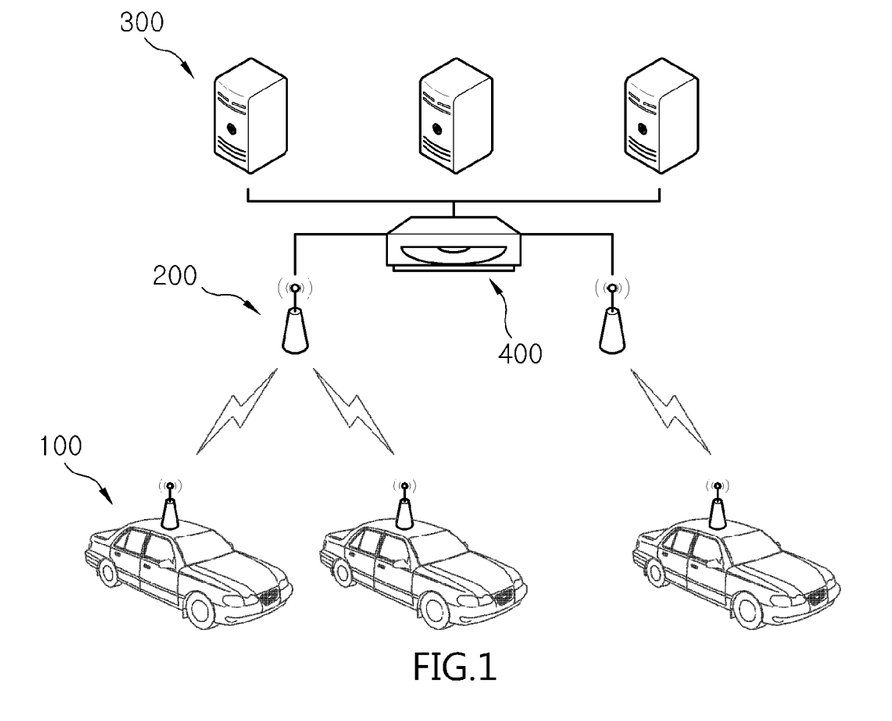
FIG. 1 is a diagram illustrating a multicasting system for a vehicular communication network according to the present invention.

FIG. 1 is a diagram illustrating a multicasting system for a vehicular communication network according to the present invention.

FIG. 1 schematically illustrates the configuration of an example of a communication system to which an embodiment of the present invention can be applied.

The multicasting system for a vehicular communication network (hereinafter referred to as "multicasting system") according to the present invention includes vehicular communication devices 100, roadside communication devices 200, vehicular communication network servers 300, and a relay 400. Here, the relay 400 may correspond to a hub or a switch.

The roadside communication devices 200 allocate slots for the multicasting of the vehicular communication devices 100 between the vehicular communication devices 100 and the vehicular communication network servers 300. In this case, the vehicular communication devices 100 send multicast packets using slot periods allocated by the roadside communication devices 200.

The roadside communication device 200 which may be plural in number may be disposed alongside roads along which the vehicular communication devices 100 move, and may have data communication areas which overlap those of neighboring roadside communication devices 200. Furthermore, the roadside communication devices 200 are connected, via communication, to neighboring roadside communication devices 200 which are spaced apart from the former roadside communication devices 200 by one hop.

The vehicular communication devices 100 send multicast packets using slot periods allocated by roadside communication devices 200 in corresponding data communication areas while moving along roads. At this time, the roadside communication devices 200 receive the multicast packets from the vehicular communication devices 100 in the corresponding data communication areas, and send the received multicast packets the corresponding packets based on a destination list.

A detailed embodiment thereof will now be described with reference to FIGS. 4 to 8.

Figure 2:
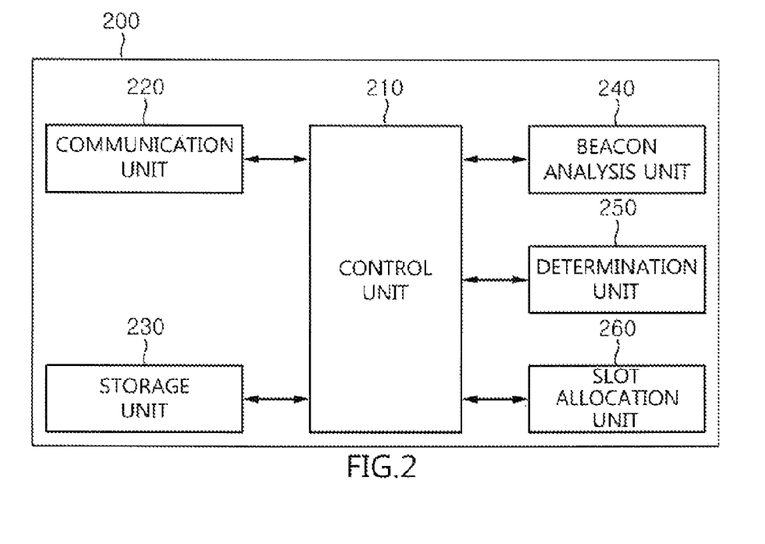
FIG. 2 is a block diagram illustrating the detailed configuration of a roadside communication device according to the present invention.

FIG. 2 is a block diagram illustrating the detailed configuration of the roadside communication device 200 according to the present invention.

As shown in FIG. 2, the roadside communication device 200 according to the present invention includes a control unit 210, a communication unit 220, a storage unit 230, a beacon analysis unit 240, a determination unit 250, and a slot allocation unit 260. Here, the control unit 210 controls the operation of the components of the roadside communication device 200 according to the present invention.

The communication unit 220 communicates with the vehicular communication device 100 located in the data communication area of the corresponding roadside communication device 200, or communicates with the vehicular communication network server 300 via the relay 400 or the Internet. Furthermore, the communication unit 220 may communicate with the neighboring roadside communication device 200 which is spaced apart by one hop.

The communication unit 220 communicates in a Time Division Multiple Access (TDMA) manner, and communicates on a superframe basis that is used in a Media Access Control (MAC) communication system. A detailed description of a superframe structure will be given with reference to FIG. 3.

The storage unit 230 stores the beacon of the roadside communication device 200. Here, the storage unit 230 stores slot allocation information included in the beacon. Furthermore, the storage unit 230 stores beacons, that is, slot allocation information, received from the neighboring roadside communication devices 200.

The beacon analysis unit 240 analyzes not only the beacon of the corresponding roadside communication device but also the beacon of the neighboring roadside communication devices 200 spaced apart by one hop when a slot allocation request is received from the vehicular communication device 100. At this time, the beacon analysis unit 240 may call and analyze the beacons of the roadside communication devices 200 stored in the storage unit 230.

Here, the beacon analysis unit 240 analyzes slot allocation information included in the beacon frames of the corresponding roadside communication device 200 and the neighboring roadside communication devices 200.

The determination unit 250 determines a slot period, which belongs to the slot periods of the corresponding roadside communication device 200 and which will be allocated to the vehicular communication device having requested slot allocation, based on the results of the analysis of the beacon analysis unit 240.

In this case, the determination unit 250 searches for a slot period which has not been allocated in common to the corresponding roadside communication device 200 and the neighboring roadside communication devices 200.

If it is determined by the determination unit 250 that a slot period which has not been allocated in common to the corresponding roadside communication device 200 and the neighboring roadside communication devices 200 is present, the slot allocation unit 260 allocates the corresponding slot period to the vehicular communication device which has requested slot allocation.

The slot allocation unit 260 stores information about slot allocation to the vehicular communication device in a beacon frame, and broadcasts it to the corresponding vehicular communication device and the neighboring roadside communication devices 200 via the communication unit 220.

Figure 3:
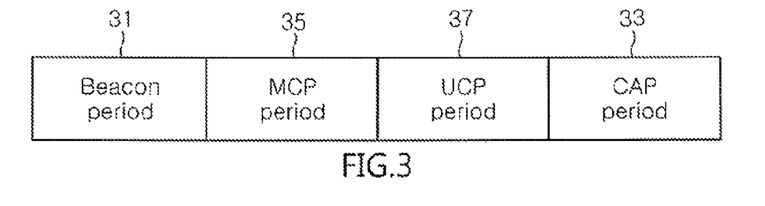
FIG. 3 is a diagram illustrating a superframe structure which is applied to the multicasting system for a vehicular communication network according to the present invention.

FIG. 3 is a diagram illustrating a superframe structure which is applied to the multicasting system for a vehicular communication network according to the present invention.

As shown in FIG. 3, a superframe applied to the present invention includes information that is used to allocate time to each communication device for the purpose of sending data so as to enable multicasting between communication devices in MAC communication.

A superframe includes slots which are basic units, and includes periods which include a plurality of slots having the same purpose. In greater detail, a superframe includes a beacon period 31, a competitive advantage period (CAP period) 33, a non-competitive multicast period (MCP period) 35, and a non-competitive unicast period (UCP period) 37.

In the beacon period 31, a beacon frame is sent. In this period, the roadside communication device periodically broadcasts the beacon frame. In the beacon period, beacon frames are sequentially broadcast from the plurality of roadside communication devices.

The CAP period 33 is a period in which media is accessed using a contention method such as Carrier Sense Multiple Access-Collision Avoidance (CSMA/CA).

The MCP period 35 is a period in which time is allocated so as to multicast packets to a plurality of destination nodes. When multicast is required, the vehicular communication device 100 is allocated a slot in an MCP period by the roadside communication device 200. Information about the slot allocated by the roadside communication device 200 is defined in a beacon frame which is broadcast by the corresponding roadside communication device 200.

The non-competitive unicast period 37 is a period in which the vehicular communication device 100 sends its own packet data within the slot period allocated by the roadside communication device 200 based on the slot allocation information defined in the beacon frame.

Figure 4:
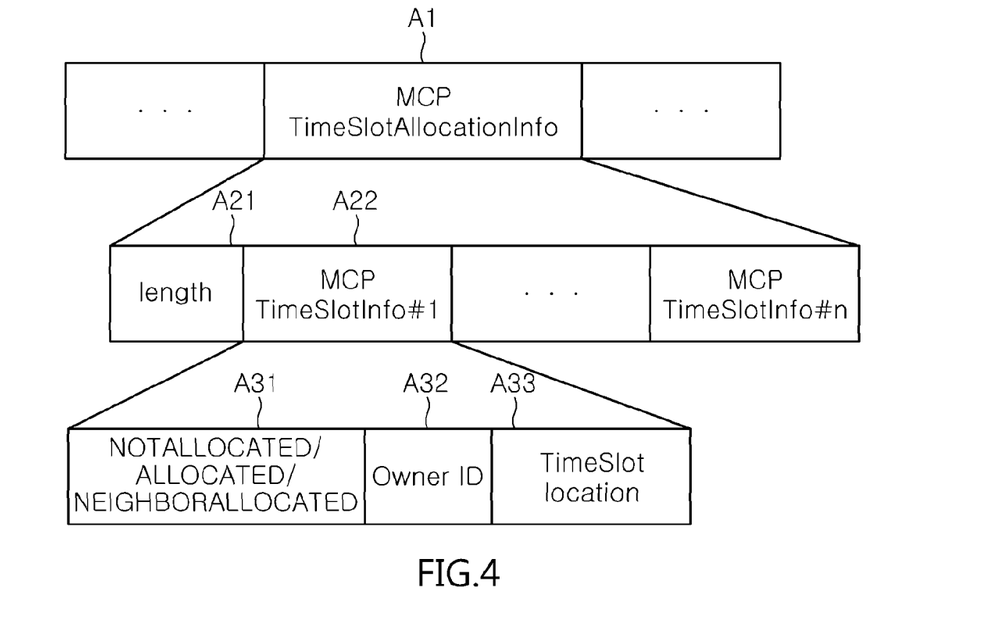
FIG. 4 is a diagram illustrating the detailed structure of a beacon frame which is applied to the multicasting system for a vehicular communication network according to the present invention.

FIG. 4 is a diagram illustrating the detailed structure of a beacon frame which is applied to the multicasting system for a vehicular communication network according to the present invention. In greater detail, FIG. 4 illustrates the slot allocation information of the roadside communication device 200, which is included in a beacon frame.

As shown in FIG. 4, the beacon frame stores the slot allocation information of the roadside communication device 200 in an MCP TimeSlotAllocationInfo field A1.

Here, the MCP TimeSlotAllocationInfo field A1 includes a length field A21 containing information about the length of the field, and in greater detail, information about the number of MCP TimeSlotInfo fields A22 and the MCP TimeSlotInfo fields A22 containing n pieces of time slot information of the roadside communication device 200.

In this case, the n pieces of time slot information of the roadside communication device are stored in n MCP TimeSlotInfo fields A22, that is, MCP TimeSlotInfo#1, . . . , and MCP TimeSlotInfo#n, respectively.

Furthermore, each of the MCP TimeSlotInfo fields A22 includes a field A31 containing information indicative of the allocation or non-allocation of a slot, that is, any one of "NOTALLOCATED", "ALLOCATED" and "NEIGHBORALLOCATED," an owner ID field A32 containing information about the ID of a communication device to which a slot was allocated, and a TimeSlot location field A33 containing information about the location of the slot allocated to the corresponding communication device.

Although not shown in FIG. 4, the MCP TimeSlotInfo field A22 may further include a Time Slot duration field containing information about the length of the slot allocated to the corresponding communication device.

Meanwhile, among the pieces of information indicative of the allocation or non-allocation of a slot, "NOTALLOCATED" indicates that the corresponding slot has not been assigned to any communication device, in which case only the TimeSlot location field A33 and the Time Slot duration field can be defined.

Furthermore, among the pieces of information indicative of the allocation or non-allocation of a slot, "ALLOCATED" and "NEIGHBORALLOCATED" allow all of the owner ID field A32, the location field A33, and the Time Slot duration field to be defined.

Meanwhile, among the pieces of information indicative of the allocation or non-allocation of a slot, "ALLOCATED" indicates that the corresponding slot has been allocated to the communication device stored in the owner ID field A32, and "NEIGHBORALLOCATED" indicates that the communication device stored in the owner ID field A32 has accessed a neighboring roadside communication device and the corresponding slot has been allocated to the corresponding communication device.

Figure 5:
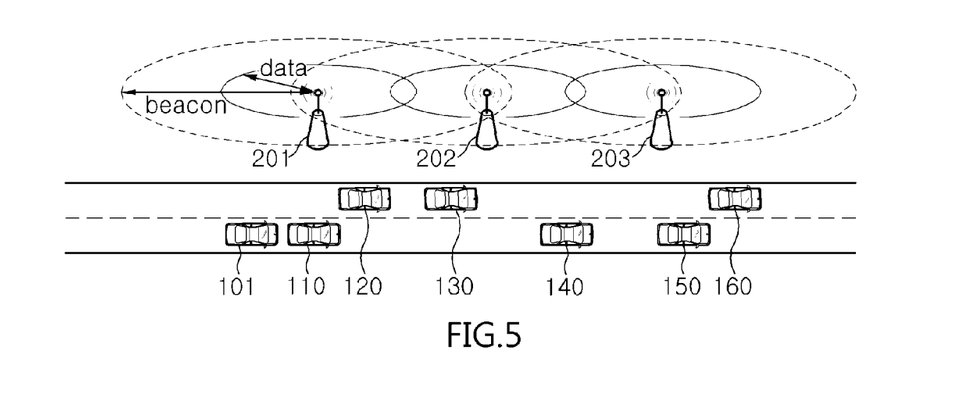
FIGS. 5 to 7 are diagrams illustrating an example of a multicasting system for a vehicular communication network according to a first embodiment of the present invention.
Figure 6:
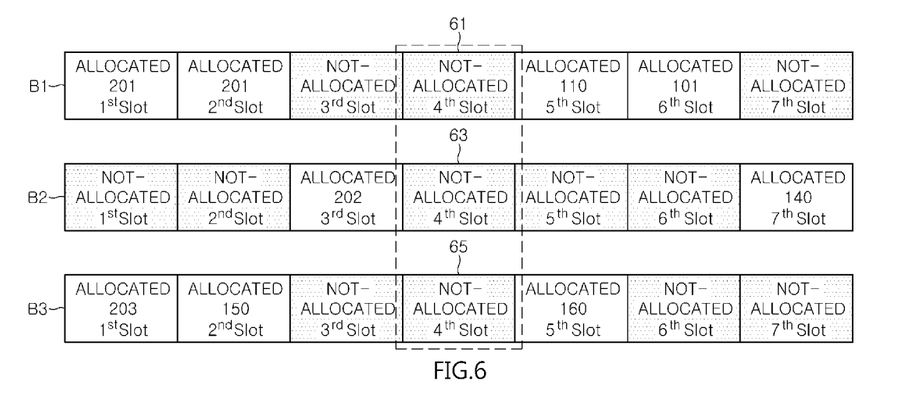
Figure 7:
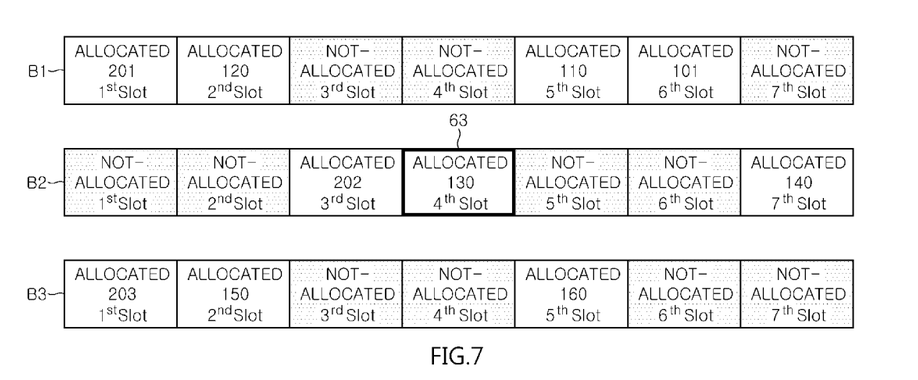

FIGS. 5 to 7 are diagrams illustrating an example of a multicasting system for a vehicular communication network according to a first embodiment of the present invention. In greater detail, these drawings illustrate an example of an operation in which roadside communication devices allocate slots to vehicular communication devices.

First, FIG. 5 illustrates a plurality of roadside communication devices disposed alongside roads, and a plurality of vehicular communication devices.

Referring to FIG. 5, the roadside communication devices are disposed at regular intervals, and each have a dual communication radius which allows its communication area to partially overlap those of neighboring roadside communication devices.

Meanwhile, the beacon frame of each of the roadside communication devices is sent at high transmission power so that it can be broadcast two times further than a data packet. Here, it is assumed that the neighboring roadside communication device is disposed within the beacon broadcast area of the corresponding roadside communication device.

Furthermore, among the vehicular communication devices shown in FIG. 5, the vehicular communication devices 101, 110 and 120 are located in the data communication area of a first roadside communication device 201, and the vehicular communication devices 130 and 140 are located in the data communication area of a second roadside communication device 202. Furthermore, among the vehicular communication devices, the vehicular communication devices 150 and 160 are located in the data communication area of a third roadside communication device 203.

When the plurality of vehicular communication devices and the roadside communication devices are disposed, as shown in FIG. 5, the slot allocation information of the first, second and third roadside communication devices is as shown in FIG. 6.

FIG. 6 illustrates the MCP TimeSlotAllocationInfo fields (with the field length fields omitted therefrom) of the beacon frames of the first, second and third roadside communication devices.

First, "B1" is the MCP TimeSlotAllocationInfo field of the beacon frame of the first roadside communication device. From "B1," it can be seen that first, second, fifth and sixth slots have been allocated to the first roadside communication device and the vehicular communication devices 120, 110 and 101, respectively.

Furthermore, "B2" is the MCP TimeSlotAllocationInfo field of the beacon frame of the second roadside communication device. From "B2," it can be seen that third and seventh slots have been allocated to the second roadside communication device and the vehicular communication device 140.

Finally, "B3" is the MCP TimeSlotAllocationInfo field of the beacon frame of the third roadside communication device. From "B3," it can be seen that first, second and fifth slots have been allocated to the third roadside communication device and the vehicular communication devices 150 and 160.

FIG. 7 illustrates the MCP TimeSlotAllocationInfo fields (with length fields omitted therefrom) of the beacon frames of the first, second and third roadside communication devices, like FIG. 6, in greater detail, an example in which the second roadside communication device allocates a slot to a new vehicular communication device.

When the second roadside communication device receives a slot allocation request from the vehicular communication device 130 located in a data communication area, the second roadside communication device checks whether slots in the same sequential positions are empty in common using the beacon frames of the first, second and third roadside communication devices.

In other words, the second roadside communication device searches for a multicast slot defined as "NOTALLOCATED" by sequentially checking on the slots of "B1", "B2" and "B3."

Referring to FIG. 6, the fourth slots 61, 63 and 65 of "B1", "B2" and "B3" are all defined as "NOTALLOCATED" and have not been allocated to communication devices, and the second roadside communication device allocates the fourth slot 63 of "B2" to the vehicular communication device 130, as shown in FIG. 7.

In this case, with respect to the fourth slot 63 of "B2" allocated to the vehicular communication device 130, the second roadside communication device incorporates slot allocation information, such as "ALLOCATED/130/4th slot," into the MCP TimeSlotInfo field of a subsequently broadcast beacon frame.

Accordingly, the vehicular communication device 130 sends data packets via the corresponding slot period based on the slot allocation information included in the beacon frame which is broadcast by the second roadside communication device.

Meanwhile, neighboring roadside communication devices which receive an updated beacon frame from the second roadside communication device update the previously stored slot allocation information of the second roadside communication device with slot allocation information included in the beacon frame newly received from the second roadside communication device.

Figure 8:
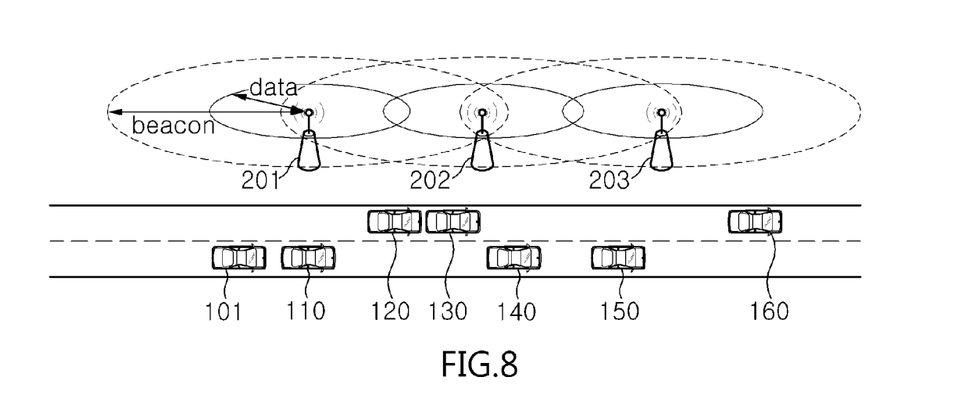
FIGS. 8 and 9 are diagrams showing an example of a multicasting system for a vehicular communication network according to a second embodiment of the present invention.
Figure 9:
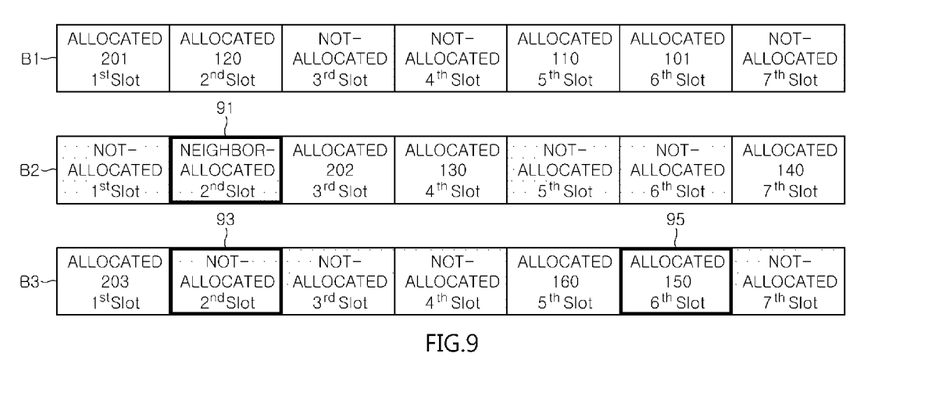

FIGS. 8 and 9 are diagrams showing an example of a multicasting system for a vehicular communication network according to a second embodiment of the present invention.

FIG. 8 illustrates an example in which in FIG. 5, the data communication areas change as the locations of the vehicular communication devices change.

As shown in FIG. 8, among the vehicular communication devices, the vehicular communication devices 101 and 110 are located in the data communication area of the first roadside communication device 201, and the vehicular communication devices 130 and 140 are located in the data communication area of the second roadside communication device 202. Furthermore, among the vehicular communication devices, the vehicular communication devices 150 and 160 are located in the data communication area of the third roadside communication device 203.

Meanwhile, among the vehicular communication devices, the vehicular communication device 120 is located in an area where the data communication areas of the first and second roadside communication devices overlap each other.

When the vehicular communication device 120 is located in an area where two data communication areas overlap each other, as shown in FIG. 8, the slot allocation information of the first, second and third roadside communication devices is shown in FIG. 9.

FIG. 9 illustrates the MCP TimeSlotAllocationInfo field (with the length field omitted therefrom) of the beacon frames of the first, second and third roadside communication devices, like FIG. 7. In greater detail, this drawing illustrates an example in which the vehicular communication device to which a slot was allocated by the neighboring roadside communication device is located in the data communication area of the second roadside communication device, and the second roadside communication device allocates a slot to the corresponding vehicular communication device.

As shown in FIG. 7, the vehicular communication device 120 was already allocated the second slot of "B1" by the first roadside communication device.

The second roadside communication device may determine whether the vehicular communication device 120 using the second multicast slot of "B1" has entered its own data communication area by overhearing before the vehicular communication device 120 performs handover from the first roadside communication device to the second roadside communication device.

In this case, when the vehicular communication device 120 is located in the data communication area of the first roadside communication device and, at the same time, has entered the data communication area of the second roadside communication device, as shown in FIG. 8, the second roadside communication device notifies neighboring roadside communication devices that the vehicular communication device 120 has entered the data communication area of the second roadside communication device. At this time, the second roadside communication device provides the notification using its own beacon frame.

By way of example, the second multicast slot of "B1" has been allocated to the vehicular communication device 120 and therefore the second roadside communication device changes the second slot 91 of "B2" to "NEIGHBORALLO-CATED," changes the owner ID to "120," and then broadcasts corresponding information to the neighboring roadside communication devices using a subsequent beacon frame.

Meanwhile, when the second slot 91 of "B2" is changed to "NEIGHBORALLOCATED/120," the third roadside communication device reallocates a slot to the vehicular communication device 150 to which the second slot was allocated in order to avoid the occurrence of a hidden node problem in connection with the second slot of "B3."

In this case, the third roadside communication device searches for a slot defined as "NOTALLOCATED" in a way identical to that of FIG. 7, and reassigns an empty sixth slot 95 to the vehicular communication device 150. The third roadside communication device also notifies the neighboring roadside communication devices of the changed slot allocation information using a subsequent beacon frame.

Figure 10:
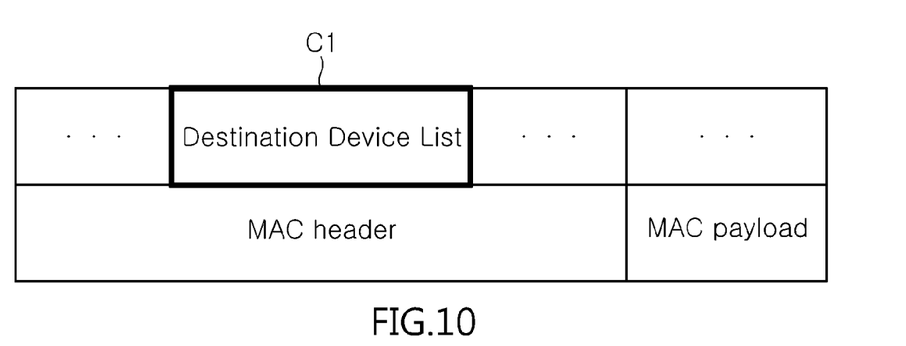
FIGS. 10 and 11 are diagrams illustrating an example of a multicasting system for a vehicular communication network according to a third embodiment of the present invention.
Figure 11:
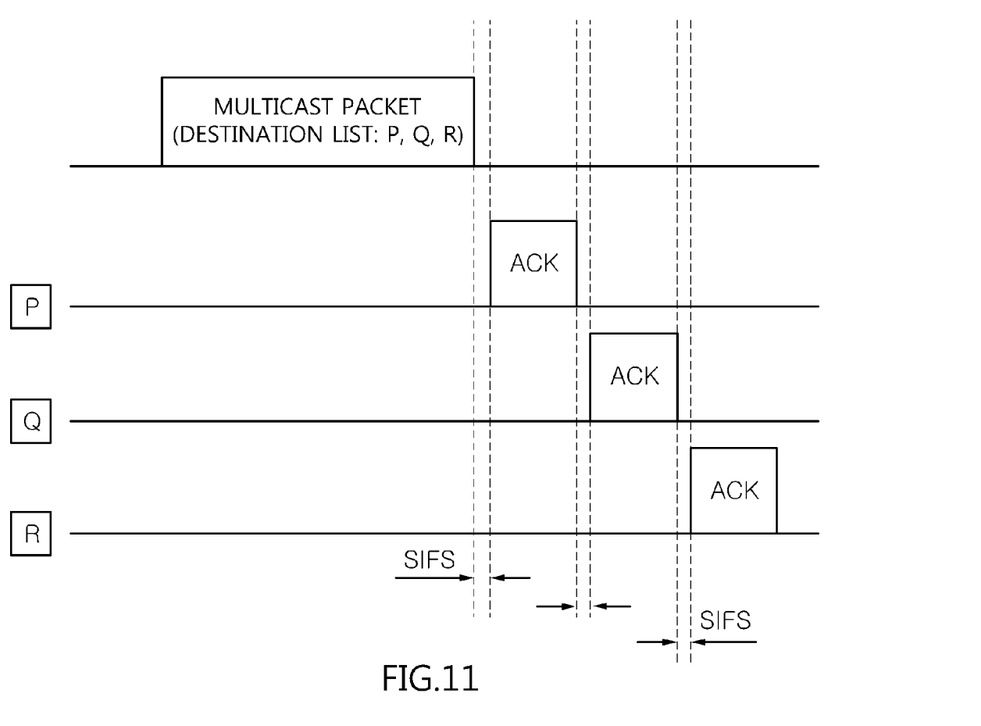

FIGS. 10 and 11 are diagrams illustrating an example of a multicasting system for a vehicular communication network according to a third embodiment of the present invention.

The vehicular communication device which was allocated a slot by the roadside communication device may send packet frames via the assigned slot period. Here, the packet frame that is sent by the vehicular communication device may be received by a plurality of communication devices.

FIG. 10 illustrates the structure of a packet frame sent by the vehicular communication device when the vehicular communication device to which a slot was allocated by the roadside communication device sends a packet frame.

As shown in FIG. 10, the packet frame sent by the vehicular communication device may be divided into an MAC header field and an MAC payload field.

In this case, the MAC header field includes a Destination Device List field C1 containing the destination information of the packet frame which is sent by the vehicular communication device.

Accordingly, the communication device which has received the packet frame from the vehicular communication device checks whether the corresponding communication device is included in the destination list contained in the Destination Device List field C1. The destination list may include one or more communication devices. If the communication device which has received the packet frame is included in the destination list, the corresponding communication device sends an ACK packet to the vehicular communication device which sent the packet frame.

An example in which a communication device which has received a packet frame sends an ACK packet to a vehicular communication device will now be described with reference to FIG. 11.

As shown in FIG. 11, communication devices at a destination, which have received packet frames, send ACK packets in a predetermined order in order to avoid contention and conflicts.

Here, the ACK packets are sent in the order of communication devices included in the destination list of the MAC header field.

By way of example, if the communication devices included in the destination list are listed in the order of communication devices P, Q and R, the communication devices P, Q and R send ACK packets in the order of the destination list.

In other words, the communication device P sends an ACK packet, and the next communication device Q sends an ACK packet after a predetermined time, for example, after a Short Interframe Space (SIFS). In the same way, the communication device Q sends an ACK packet, and the next communication device R sends an ACK packet after a predetermined time, for example, after an SIFS.

It will be apparent that it is assumed that the communication devices P, Q and R have been synchronized with one another.

In this case, the vehicular communication device which sent the data packet may resend a corresponding data packet to the communication device which has not received the ACK packet. The destination list of the packet to be resent contains only the destination communication device which has not received the ACK packet.

Figure 12:
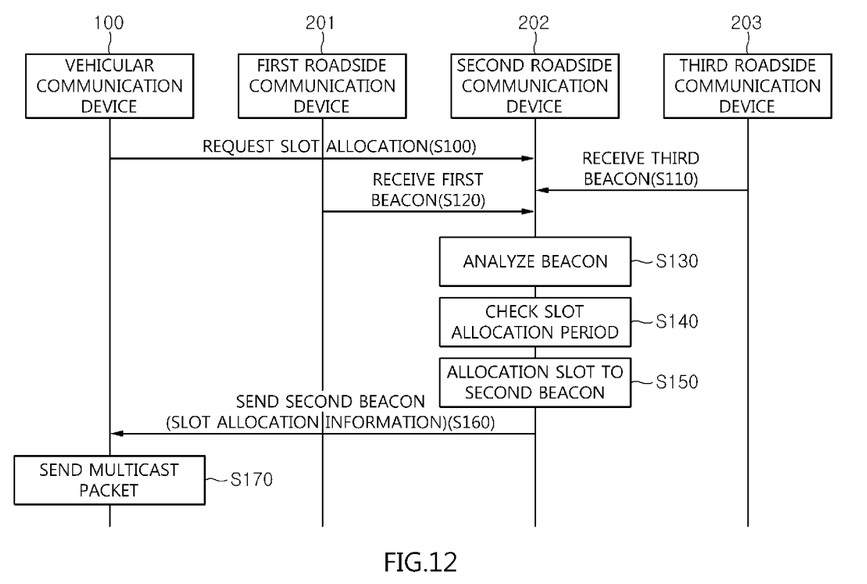
FIG. 12 is a flowchart illustrating a multicasting method for a vehicular communication network according to the present invention.

FIG. 12 is a flowchart illustrating a multicasting method for a vehicular communication network according to the present invention. FIG. 12 illustrates the process of allocating a slot to the vehicular communication device located in the data communication area of the second roadside communication device.

As shown in FIG. 12, the vehicular communication device which has not been allocated a slot requests the allocation of a slot from the second roadside communication device related to the corresponding vehicular communication device so as to perform multicasting at step S100. Here, the vehicular communication device requests the allocation of a slot in the MCP period of a superframe.

In this case, the second roadside communication device which has received the slot allocation request from the vehicular communication device receives first and third beacons from neighboring first and second roadside communication devices at steps S110 and S120. Although the third and first beacons are illustrated as being received in order in FIG.

12, the order of the reception of the beacons may be changed. Steps S110 and S120 are performed in the beacon period of a superframe.

Here, the roadside communication device which allocates a slot negotiates for the allocation of a slot while exchanging beacons. In order to avoid the loss of packets attributable to collisions resulting from the problem of duplicate use of a slot of the communication devices and a hidden node problem, the roadside communication device which allocates a slot allocates the slot while negotiating with neighboring roadside communication devices spaced apart by one hop.

The second roadside communication device analyzes the beacons, that is, first, second and third beacons, of the first, second and third roadside communication devices at step S130, and determines a period for the allocation of the slot of the vehicular communication device at step S140.

In other words, the second roadside communication device sequentially checks the "NOTALLOCATED" slots of the first, second and third beacons so as to allocate the slot to the vehicular communication device.

In this case, the second roadside communication device searches for a slot which was defined as "NOTALLOCATED" in common in the first, second and third beacons and allocates the corresponding slot of the second beacon to the vehicular communication device at step S150.

The slot allocation information at step S150 is sent in the second beacon of the second roadside communication device at step S160.

Accordingly, at step S170, the vehicular communication device which has received the slot allocation information at step S160 sends a multicast packet using the slot period allocated at step S150.

Although FIG. 12 illustrates the case when the vehicular communication device requests the allocation of a slot, the above-described process may be applied to the case when a slot is allocated between the roadside communication devices. However, in the case when a slot is allocated to the roadside communication device itself, step S100 may be omitted.

The present invention has the advantage of improving the reliability of the transmission of TDMA-based data packets between a roadside communication device and a vehicular communication device.

In particular, the present invention has the advantage of improving the reliability of the transmission of packets because the beacon frames of a roadside communication device and its neighboring roadside communication devices are analyzed and a slot of the vehicular communication device is allocated in a period in which a slot has not been allocated in common.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A roadside communication devices comprising: a communication unit configured to communicate with a plurality of vehicular communication devices and at least one neighboring roadside communication device;
   a beacon analysis unit configured to analyze beacon frames from the roadside communication device and the at least one neighboring roadside communication device when a slot allocation request is received from one of the vehicular communication devices;
   a determination unit configured to search for a period in which a slot has not been allocated by the roadside communication device and the at least one neighboring roadside communication device and determine whether a period for allocation of a slot to the vehicular communication device is present; and
   a slot allocation unit configured to allocate a slot period for multicasting by the vehicular communication device based on results of the determination of the determination unit;
   wherein the slot allocation unit, when the vehicular communication device enters a data communication area of the roadside communication device after a slot period has been allocated by the at least one neighboring roadside communication device, allocates information about the entry of the vehicular communication device to a period which belongs to a slot period of the beacon frame of the roadside communication device and which corresponds to the slot period allocated by the at least one neighboring roadside communication device.

2. The roadside communication device of claim 1, wherein the determination unit searches for a period in which a slot has not been allocated in common by the roadside communication device and the at least one neighboring roadside communication device.

3. The roadside communication device of claim 1, wherein the communication unit communicates using superframes that are used in a Time Division Multiple Access (TDMA) Media Access Control (MAC) communication system.

4. The roadside communication device of claim 3, wherein each of the superframes comprises a beacon period in which the beacon frame of the roadside communication device is sent, a competitive advantage period in which media is accessed, a non-competitive multicast period in which the slot period is allocated to the vehicular communication device, and a non-competitive unicast period in which the vehicular communication device sends data packets via the allocated slot period.

5. The roadside communication device of claim 1, wherein:
   the slot allocation unit sends information about the allocation of the slot period to the vehicular communication device with information included in a beacon frame; and
   the information about the allocation of the slot period is stored in an MCP TimeSlotAllocationInfo field of the beacon frame.

6. The roadside communication device of claim 5, wherein the MCP TimeSlotAllocationInfo field of the beacon frame comprises MCP TimeSlotInfo fields containing n pieces of information about slots allocated by the slot allocation unit, and a length field containing information about a number of the MCP TimeSlotInfo fields.

7. The roadside communication device of claim 6, wherein each of the MCP TimeSlotInfo fields comprises at least one of a field containing information about allocation or non-allocation of a slot, an owner ID field containing information about an ID of a communication device to which the slot was allocated, a TimeSlot location field containing information about a location of the slot, and a Time Slot duration field containing information about a length of the slot.

8. The roadside communication device of claim 1, wherein the communication unit is connected, via communication, to neighboring roadside communication devices that are spaced apart by one hop.

9. A method, by a roadside communication device, comprising:

receiving a beacon frame from at least one neighboring roadside communication device when a slot allocation request is received from each of the vehicular communication devices;

analyzing beacon frames received from the roadside communication device and the at least one neighboring roadside communication device;

searching for a period in which a slot has not been allocated by the roadside communication device and the at least one neighboring roadside communication device; and allocating a slot period for multicasting by the vehicular communication device based on results of the searching of the determination unit;

wherein the allocating comprises, when the vehicular communication device enters a data communication area of the roadside communication device after a slot period has been allocated by the at least one neighboring roadside communication device, allocating information about the entry of the vehicular communication device to a period which belongs to a slot period of the beacon frame of the roadside communication device and which corresponds to the slot period allocated by the at least one neighboring roadside communication device.

10. The method of claim 9, wherein the searching comprises searching for a period in which a slot has not been allocated in common by the roadside communication device and the at least one neighboring roadside communication device.

11. The method of claim 9, wherein:
the allocating comprises sending information about the allocation of the slot period to the vehicular communication device with the information included in a beacon frame; and
the information about the allocation of the slot period is stored in an MCP TimeSlotAllocationInfo field of the beacon frame.

12. The method of claim 11, wherein the MCP TimeSlotAllocationInfo field of the beacon frame comprises MCP TimeSlotInfo fields containing n pieces of information about allocated slots, and a length field containing information about a number of the MCP TimeSlotInfo fields.

13. The method of claim 12, wherein each of the MCP TimeSlotInfo fields comprises at least one of a field containing information about allocation or non-allocation of a slot, an owner ID field containing information about an ID of a communication device to which the slot was allocated, a TimeSlot location field containing information about a location of the slot, and a Time Slot duration field containing information about a length of the slot.

14. The method of claim 9, wherein the receiving comprises receiving a beacon frame from at least one neighboring roadside communication device that is spaced apart by one hop.

* * * * *